United States Patent
Wright

(10) Patent No.: US 7,082,102 B1
(45) Date of Patent: Jul. 25, 2006

(54) SYSTEMS AND METHODS FOR POLICY-ENABLED COMMUNICATIONS NETWORKS

(75) Inventor: Steven A. Wright, Roswell, GA (US)

(73) Assignee: BellSouth Intellectual Property Corp., Wilmington, DE (US)

(*) Notice: Subject to any disclaimer, the term of this patent is extended or adjusted under 35 U.S.C. 154(b) by 947 days.

(21) Appl. No.: 09/956,002

(22) Filed: Sep. 20, 2001

Related U.S. Application Data

(60) Provisional application No. 60/241,374, filed on Oct. 19, 2000.

(51) Int. Cl.
*G01R 31/08* (2006.01)

(52) U.S. Cl. ............ 370/229; 370/254; 370/351

(58) Field of Classification Search ........ 370/229, 370/230, 254, 255, 351; 709/220
See application file for complete search history.

(56) References Cited

U.S. PATENT DOCUMENTS

| | | | |
|---|---|---|---|
| 6,341,127 B1* | 1/2002 | Katsube et al. ............ 370/352 |
| 6,466,548 B1* | 10/2002 | Fitzgerald .................. 370/249 |
| 6,466,984 B1* | 10/2002 | Naveh et al. ............... 709/228 |
| 6,611,863 B1* | 8/2003 | Banginwar .................. 709/220 |
| 6,614,781 B1* | 9/2003 | Elliott et al. ................ 370/352 |
| 6,633,635 B1* | 10/2003 | Kung et al. ............ 379/215.01 |
| 6,665,273 B1* | 12/2003 | Goguen et al. ............. 370/252 |
| 6,778,494 B1* | 8/2004 | Mauger ....................... 370/230 |
| 6,856,676 B1* | 2/2005 | Pirot et al. ............. 379/201.01 |
| 2002/0019879 A1* | 2/2002 | Jasen et al. ................. 709/240 |

OTHER PUBLICATIONS

Jeff Hayes, "Policy-based Authentication and Authorization", Apr. 2000, Alcatel IND, pp. 1-11.*
Wright et al, "Requirements for Policy Enabled MPLS," Mar. 2000, 16 pages.
Wright et al, "Policy-Based Load-Balancing in Traffic-Engineered MPLS Networks," Jun. 2000, 13 pages.
Wright et al, "Traffic Engineering of Load Distribution," Jul. 2000, 15 pages.
Reichmeyer et al, "COPS Usage for MPLS/Traffic Engineering," Jul. 2000, 13 pages.
Chadha et al, "Policy Information Model for MPLS Traffic Engineering," Jul. 2000, 61 pages.
Isoyama et al, "Policy Framework QoS Information Model for MPLS," Jul. 12, 2000, 31 pages.

* cited by examiner

*Primary Examiner*—Chau Nguyen
*Assistant Examiner*—Jung Park
(74) *Attorney, Agent, or Firm*—Withers & Keys, LLC

(57) ABSTRACT

Embodiments of the present invention relate to systems and methods for policy-based management of a multiprotocol label switching ("MPLS") network. In an embodiment, a system includes a policy-based network administration system, and the policy-based network administration system includes a plurality of policies. The system also includes an MPLS network, which is coupled to the policy-based network administration system.

18 Claims, 10 Drawing Sheets

US 7,082,102 B1

SYSTEMS AND METHODS FOR POLICY-ENABLED COMMUNICATIONS NETWORKS

CROSS-REFERENCE TO RELATED APPLICATION

This application claims the benefit of U.S. Provisional Patent Application Ser. No. 60/241,374 filed Oct. 19, 2000, which is herein incorporated by reference in its entirety.

BACKGROUND OF THE INVENTION

1. Field of the Invention

Embodiments of the present invention relate to communications networks. More particularly, embodiments of the present invention relate to systems and methods for policy-enabled communications networks.

2. Background Information

Known policy controls enable improved administrative control of network capabilities to meet, for example, service objectives. For example, a policy control can specify that a data packet received by a network element of a communications network from a particular source is to be routed through the network in a specific way instead of the default way. A policy control can also be role-based and apply to certain network elements (e.g., edge routers) instead of other network elements (e.g., internal routers). Multi-protocol label switching ("MPLS") networks can provide efficient and/or explicit routing capabilities for Internet Protocol ("IP") networks, which may be a key element in the traffic engineering of those IP networks. In view of the foregoing, it can be appreciated that a substantial need exists for systems and methods that can advantageously provide for policy-enabled MPLS networks.

SUMMARY OF THE INVENTION

Embodiments of the present invention relate to systems and methods for policy-based management of a multiprotocol label switching network. In an embodiment, a system includes a policy-based network administration system, and the policy-based network administration system includes a plurality of policies. The system also includes an MPLS network, which is coupled to the policy-based network administration system.

DETAILED DESCRIPTION OF THE INVENTION

According to an embodiment of the present invention, a system for policy management for MPLS network includes life cycle management (e.g., creating, deleting, monitoring, and so forth) of Label Switched Paths ("LSP") paths through the MPLS network. In an embodiment, the policy management includes controlling access (e.g., LSP Admission Control) to the life cycle managed resources for traffic on the MPLS network.

MPLS can support explicit traffic engineering via a number of specifications that allow LSPs to be managed based on Quality-of-Service ("QoS") and other constraints, such as, for example, Constraint-based Routing Label Distribution Protocol ("CR-LDP"), Resource Reservation Protocol ("RSVP"), and so on. MPLS can also be used with implicit traffic engineering of LSP Quality of Service. Specific QoS mechanisms (e.g., DiffServ, Int-Serv, etc.) can be used. The policy management architecture used to control traffic engineering functionality can be independent of the MPLS mechanisms used and can provide consistent, predictable network services. In an embodiment, MPLS policy control is intra-domain and can be based on using Common Open Policy Service ("COPS") to implement policy management.

Figure 1:
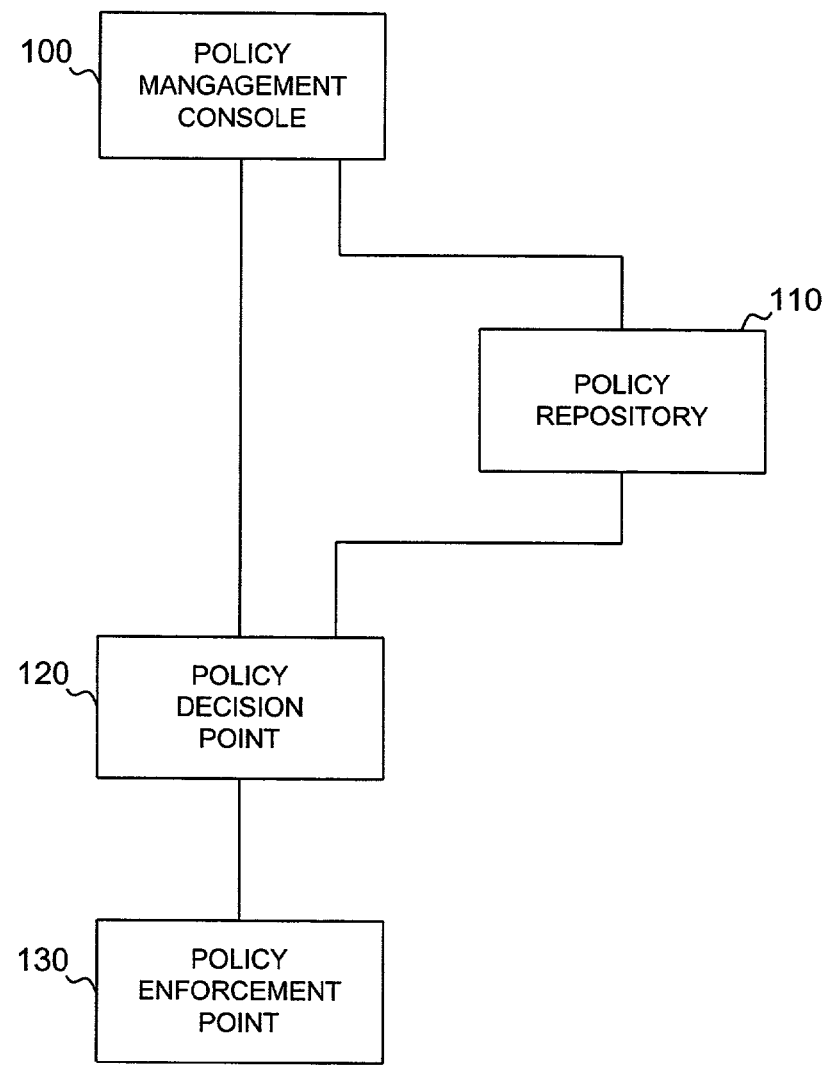
FIG. 1 is a schematic diagram of the general architecture of an embodiment of a policy-based network management system.

FIG. 1 is a schematic diagram of the general architecture of an embodiment of a policy-based network management system. In an embodiment, policy-based networking provides an infrastructure for management of networks with a rich set of management capabilities. The basic components of a policy-based management system can include a Policy Decision Point ("PDP") 120 and Policy Enforcement Point ("PEP") 130. The PDP 120 can be a logical component residing within a Policy Server, and the PEP 130 can be a logical component, usually residing in a network device. Other components of a policy management system can include a policy management console ("PMC") 100 to provide a human interface to the policy system and a policy repository ("PR") 110 to store the policy. The PMC 100 can be used to generate policies for storage in the policy repository 110 and to administer the distribution of policies across various PDP 120. Policies may also be imported into the system via other mechanisms. For example, they may be retrieved from a Lightweight Directory Access Protocol ("LDAP") directory and stored directly into the policy repository 110. From the PDP 120, policy rules may be installed in the network and implemented at one or more PEPs 130.

Decisions regarding what policy rules are to be installed in the network devices can be the result of several different events. There are primarily at least two models of policy management that determine how and when policy decisions get made, provisioned, and outsourced. In policy provisioning, events occur at the PDP 120 that may cause the PDP 120 to install policy rules in the one or more PEPs 130. Examples of such events include human intervention (via the policy management console 100), signaling from an external application server, feedback about dynamic state changes in the devices that the PDP 120 is managing, and so forth. In policy outsourcing, events can occur at the PEPs 130 and require a policy-based decision, and the PEP 130 can request the decision from the PDP 120. An example of this type of event is the receipt of an RSVP message, or some other network signaling protocol, containing policy information and a request for resource reservation. The PEP 130 sends a message to the PDP 120 requesting a decision based on the policy information provided whether to accept or deny the resource reservation request.

Figure 2:
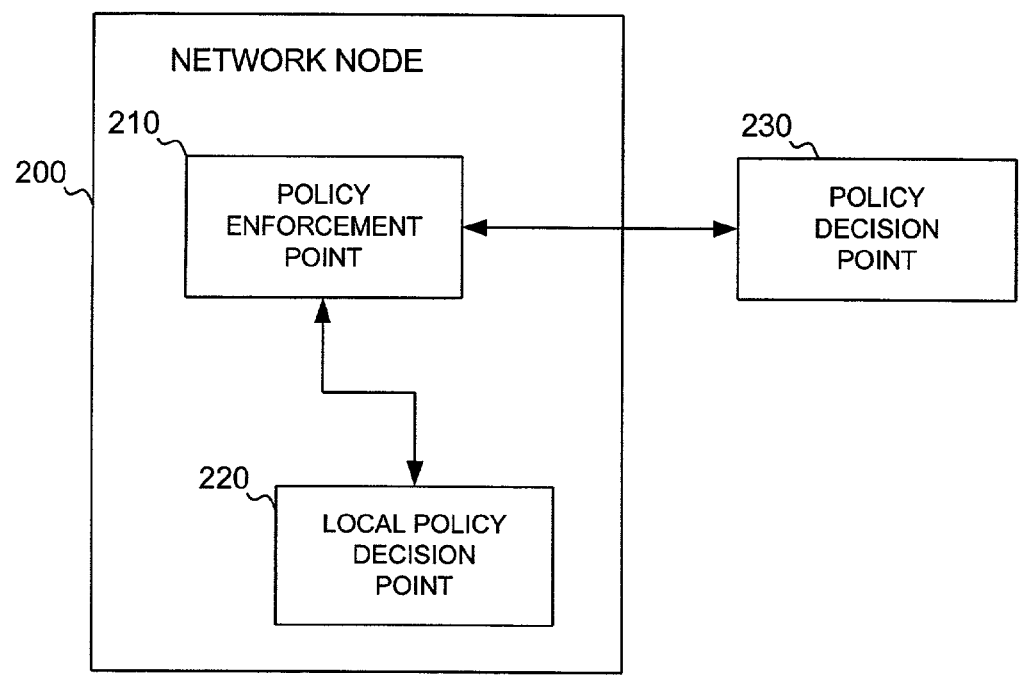
FIG. 2 is a schematic diagram illustrating a policy architecture for admission control decisions.
Figure 3:
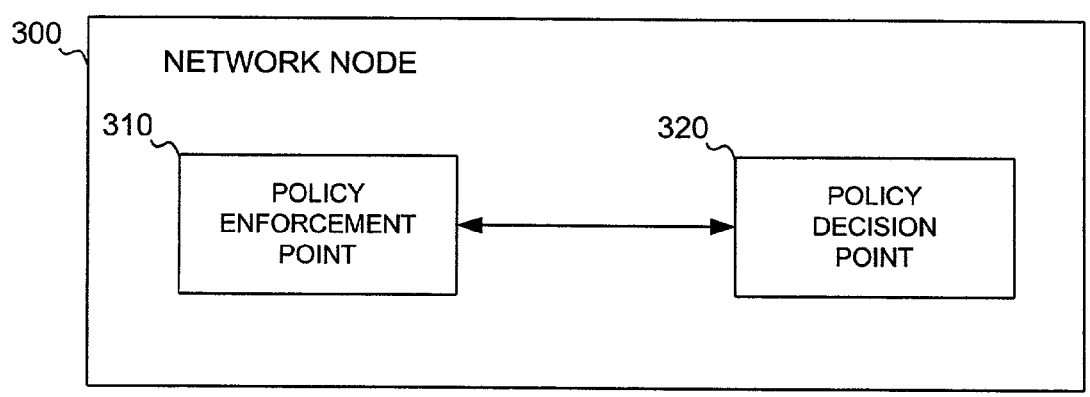
FIG. 3 shows another configuration of a policy control architecture.

FIG. 2 is a schematic diagram illustrating a policy architecture for admission control decisions. A network node 200 can include a PEP 210 and a Local Policy Decision Point ("LPDP") 220. The PEP 210 can first use the LPDP 220 to reach a local partial decision. The partial decision and the original policy request next can be sent to a PDP 230 that renders a final decision (e.g., considering and approving or considering and overriding the LPDP 220). FIG. 3 shows another configuration of a policy control architecture. A network node 300 can include a PEP 310 and a PDP 320.

The policy management system can include feedback from a PEP (e.g., PEPs 130, 210, 310) to a PDP (e.g., PDPs 120, 220, 230, 320). The feedback can include information such as changes in dynamic state of network resources, link failures and congestion, statistics related to installed policy, etc. The information supplied by the PEPs may be used by the PDP to make future policy-based decisions or make changes to current decisions regardless of the implemented policy management model. Policy protocols have been developed, such as COPS, that can provide this robust feedback mechanism for policy management applications. By specifying the proper information in a Policy Information Base ("PIB"), a PDP can receive feedback on a variety of parameters such as flow characteristics and performance.

Figure 4:
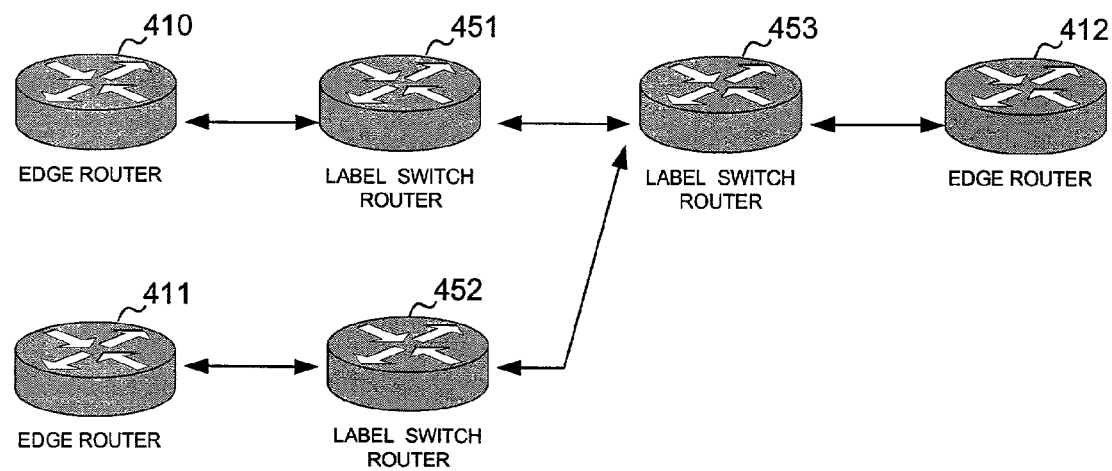
FIG. 4 shows an illustration of a multipoint-to-point Label Switched Path traversing an MPLS network.

FIG. 4 is an illustration of a multipoint-to-point ("MPt-Pt") Label Switched Path ("LSP") traversing an MPLS network. An LSP in MPLS is typically a sink-based tree structure traversing a series of Label Switch Routers ("LSRs") 451–453 between ingress and egress Edge Routers ("ERs") 410–412. In an embodiment, a merging function can be implemented at the LSRs. In another embodiment, a merging function may not be supported by certain classes of equipment (e.g., legacy ATM switches), and Point-to-Point LSPs are a degenerate case of MPt-Pt LSPs where no merging is performed.

In MPLS networks, choosing the next hop can be based at least upon two functions. The first function can classify all possible packets into a set of Forwarding Equivalence Classes ("FECs"). The second function can map each FEC to a next hop. In conventional IP forwarding, a particular router will typically consider two packets to be in the same FEC if there is some address prefix X in that router's routing tables such that X is the "longest match" for each packet's destination address. As the packet traverses the network, each hop in turn re-examines the packet and assigns it to a FEC. In MPLS, the assignment of a particular packet to a particular FEC can be done just once. At subsequent hops along the LSP, there is no further analysis of the packet's network layer header, which has a number of advantages over conventional network layer forwarding including, for example, the following.

(a) MPLS forwarding can be done by switches that are capable of doing label lookup and replacement (e.g., ATM switches).

(b) The considerations that determine how a packet is assigned to a FEC can become ever more and more complicated without impact on the routers that merely forward labeled packets. Since a packet is classified into an FEC when it enters the network, the ingress edge router may use any information it has about the packet, even if that information cannot be gleaned from the network layer header. For example, packets arriving on different ports or at different routers may be assigned to different FECs.

(c) Sometimes it is desirable to force a packet to follow an explicit route, rather than being chosen by the normal dynamic routing algorithm as the packet travels through the network. This may be done as a matter of policy, or to support traffic-engineering objectives such as load balancing.

(d) MPLS allows (but does not require) the class of service to be inferred from the label. In this case, the label represents the combination of a FEC and Quality of Service.

(e) MPLS also permits the use of labels in a hierarchical form in a process known as label stacking.

Figure 5:
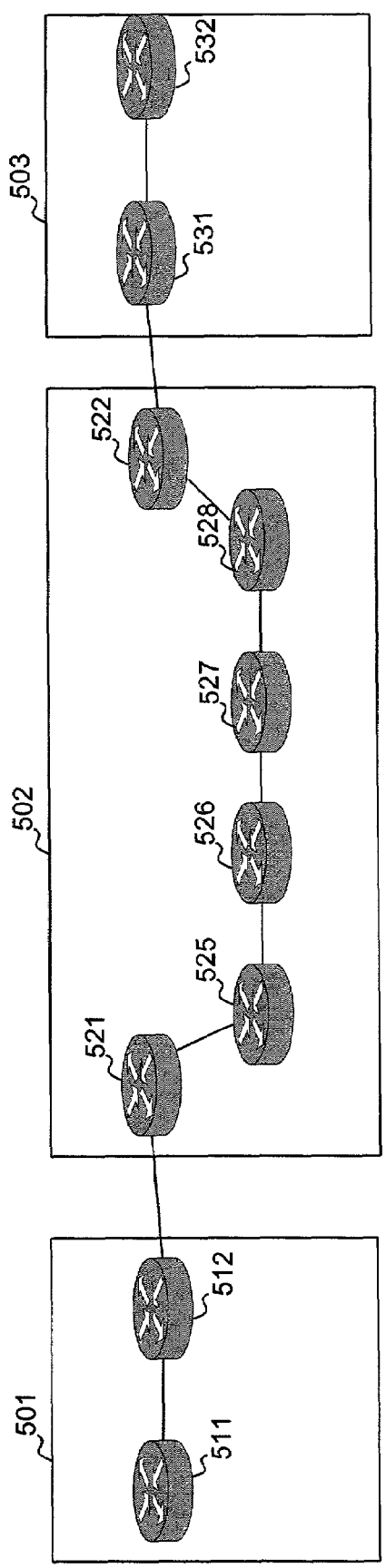
FIG. 5 shows an example of the use of MPLS in a hierarchy.

FIG. 5 shows an example of the use of MPLS in a hierarchy. MPLS may operate in a hierarchy, for example, by using three transit routing domains such as domains 501, 502, and 503. Domain Boundary Routers 511–512, 521–522, and 531–532 are shown in each domain and can be operating under the Border Gateway Protocol ("BGP"). Internal routers are not illustrated in domain 501 and 503. However, internal routers 525–528 are illustrated within domain 502. In particular, the path between routers 521 and 522 follows the internal routers 525, 526, 527, and 528 within domain 502. In the hierarchy illustrated in FIG. 5, there are two levels of routing taking place. For example, Open Shortest-Path First ("OSPF") may be used for routing within domain 502. The domain boundary routers 511–512, 521–522, and 531–532 can operate BGP to determine paths between routing domains 501, 502 and 503. MPLS allows label forwarding to be done independently at multiple levels. Thus, when an IP packet traverses domain 502, it can contain two labels encoded as a "label stack". The higher level label may be used between routers 521 and 522 and encapsulated inside a header specifying a lower level label used within domain 502.

According to an embodiment of the present invention, a policy-enabled MPLS network includes Policy rules Information Base ("PIB") elements that identify LSPs and policy actions that affect LSPs, such as, for example, admission of flows to LSPs, LSP life cycle operations such as creation/deletion of LSPs, and so on. Policy controls for MPLS can provide a rich environment for the creation of network services in an efficient manner. Operational advantages in a policy-based approach to the management and control of MPLS networks include the following:

(a) MPLS Abstraction. While MPLS can be controlled directly through relevant Management Information Bases ("MIBs"), the use of a higher abstraction level PIB provides a mechanism to abstract away some of the implementation options within MPLS and to focus on operational advantages such as, for example, those provided by explicit routing capabilities.

(b) Controllability of LSP Life Cycle. While MPLS may be operated in an autonomous fashion (e.g., with topology-driven LSP establishment), the autonomous operation does not necessarily provide the explicit routes and QoS required for traffic engineering. While manual establishment of explicit route LSPs with associated QoS parameters may be feasible, issues of scale and consistency when applied in large networks can arise.

(c) Consistency with other techniques. The need for MPLS and DiffServ to interact appropriately and the work for policy controls for DiffServ networks are known. In an embodiment, policy controls can be applied to MPLS networks that may, but do not necessarily, implement DiffServ.

(d) Flexibility in LSP Admission Control. The set of flows admitted to an LSP my change over time. Policy provides a mechanism to simplify the administration of dynamic LSP admission criteria in order to optimize network performance. For example, LSP admission control policies may be established to vary the set of admitted flows to match projected time-of-day sensitive traffic demands.

(e) Integration with Network Service Objectives. Policy-based networking architecture can provide a mechanism to link service level objectives of the network to specific protocol actions within MPLS.

Figure 6:
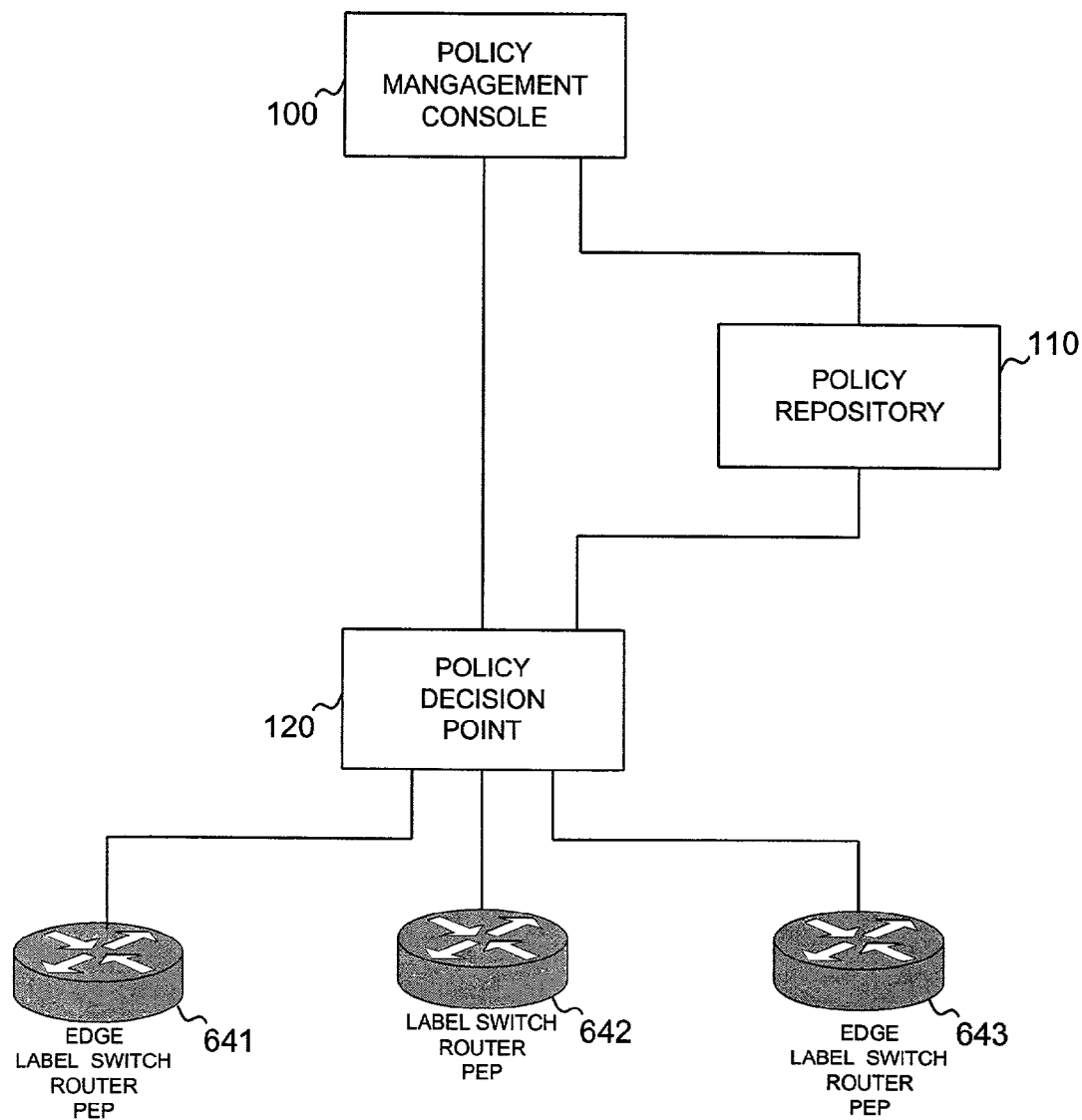
FIG. 6 shows a schematic diagram of an intra-network architecture of a policy-based network management system.

FIG. 6 shows a schematic diagram of an intra-network architecture of a policy-based network management system. Applying the policy-based network architecture to the MPLS network, the Edge Label Switch Routers ("ELSRs") 641, 643 become the PEP as they are involved in the admission control of flows to the LSP. Intervening LSRs, such as LSR 642, may also be PEPs, for example, in the case of MPt-Pt LSPs. Embodiments can use a generic computing platform and leave the LSR as a Policy Ignorant Node ("PIN") or consider them the same piece of equipment.

Embodiments of the present invention relate to one or more of two main categories of policies for MPLS: (1) LSP Admission Policies that map traffic flows onto LSPs; and (2) LSP Life Cycle Policies affecting LSP creation, deletion, configuration, and monitoring. Mapping traffic flows onto LSPs involves a policy system setting up classifiers in the ingress LSR(s) of an LSP to identify which packets get admitted onto the LSP and process the packets accordingly. In MPLS, label switched paths can be associated with a Forwarding Equivalence Class (FEC) that specifies which packets are to be sent onto the LSP. Classifiers from the policy server can define the characteristics of the FEC, and packets/flows that match these characteristics are sent over the LSP. In this way, the FEC that gets mapped onto an LSP can be defined according to a number of flow characteristics such as application, source/destination/subnet address, user, DiffServ code point on incoming packet, and so on. Configuring LSPs involves the creation and deletion of LSPs in the network according to some QoS or other criteria. This can be achieved in a number of ways, such as manual creation or invoking one of the label distribution mechanisms that support this (CR-LDP, RSVP). After a label switched path is created, it can be monitored for performance to ensure that the service it provides continues to behave as expected. For example, LSP MIB counters, such as a count of packets dropped in a particular LSP, can be used to gauge performance. If the configured resources along the LSP become insufficient for the traffic requests for resources, or if the requirements change, a new path may be necessary or an existing one changed according to a new set of constraints. As part of the policy-based management of MPLS, the LSRs can provide feedback to the policy system to perform this monitoring. For example, an LSP performance table can track incoming and outgoing statistics related to octets, packets, drops, and discards on MPLS trunks. Using this information, the LSR can notify the server when performance levels fall below some threshold based on the available statistics. The server would then have the ability to enhance the current LSP or create alternatives.

LSP Admission Policies. While an LSP can be configured for use with best effort traffic services, there are often operational reasons and service class reasons for restricting the traffic that may enter a specific LSP. Classification can result in admission to the FEC associated with a specific LSP. The admission criteria may include, for example, the following criteria: (a) a DiffServ marking as one of the potential classification mechanisms; (b) authentication, for example, for access to an LSP-based Virtual Private Network ("VPN"); or (c) traffic engineering policies related to architectures other than DiffServ (e.g. Int-Serv).

An MPLS framework can consider classification in terms of establishing a flow with a specific granularity. These granularities can be a base set of criteria for classification policies, such as the following examples of unicast traffic granularities:

PQ (Port Quadruples): same IP source address prefix, destination address prefix, TTL, IP protocol and TCP/UDP source/destination ports;

PQT (Port Quadruples with TOS): same IP source address prefix, destination address prefix, TTL, IP protocol and TCP/UDP source/destination ports and same IP header TOS field (including Precedence and TOS bits);

HP (Host Pairs): same specific IP source and destination address (32 bit);

NP (Network Pairs): same IP source and destination address prefixes (variable length);

DN (Destination Network): same IP destination network address prefix (variable length);

ER (Egress Router): same egress router ID (e.g. OSPF);

NAS (Next-hop AS): same next-hop AS number (BGP);

DAS (Destination AS): same destination AS number (BGP);

The MPLS framework also can include the following multicast traffic granularities:

SST (Source Specific Tree): same source address and multicast group

SMT (Shared Multicast Tree): same multicast group address for LSP admission decisions based on QoS criteria, the calculations may involve other traffic characteristics relating to buffer occupancy and scheduling resource decisions. These may include parameters such as: (a) burstiness measures (e.g., Path MTU size or Packet size); or (b) inferred or signaled bandwidth requirements.

LSP Life Cycle Policies. MPLS permits a range of LSP creation/deletion modes from relatively static, manually provisioned LSPs, dynamic LSPs initiated in response to routing topology information, and data driven LSP generation. Policy impacts can vary depending on the LSP creation/deletion modes. MPLS supports a variety of mechanisms for the creation/deletion of LSPs, such as manual provisioning, LDP, CR-LDP, RSVP, BGP, etc. In an embodiment, the policy should be independent of the underlying mechanism.

For example, with manually provisioned LSPs, the role of policy may be to restrict the range of authorized users that can create or delete LSPs, or the range of addresses that can be connected by LSPs (e.g., Intra-Domain, intra-VPN, and so on). With topology driven LSP setup, there may be policy constraints on speed of re-establishment of LSPs or the number of LSPs. With data driven LSP establishment, there can be policies related to the data characteristics that trigger the creation or deletion of an LSP.

When created, LSPs may have certain attributes. For example, traffic-engineering policies may be applied to reserve network resources such as bandwidth on specific links for an LSP. LSPs in general are sink-based tree structures. The merge points of the LSP may have policies such as, for example, policies associated with the buffer management at the merge point. The characteristics or attributes of an LSP may be impacted by different policy considerations. They can be impacted at the time of LSP creation or may be altered for an existing LSP.

In an embodiment, a policy-enabled MPLS system can include the following features and/or functions: (a) a label distribution protocol that supports the specification of QoS constraints; (b) LSPs are established as administratively specified explicit paths where the route is specified either entirely or partially at the time the path is established; and (c) COPS and PIBs are used for policy protocol between a policy server (e.g., a PDP) and LSRs (e.g., PEPs). The policy-enabled MPLS system can include three phases: (a) LSP setup; (b) LSP admission control; and (c) LSP monitoring.

LSP Setup. In an embodiment, a PDP determines that an LSP is to be established. Possible choices for how the PDP gets signaled to make this determination include: human input at the network management console (e.g., manually provisioned LSP), receipt of a trigger from an ingress LSR as a result of receiving a particular type of data packet, or observing a particular performance level deficiency (e.g., data-driven LSP provisioning). In the case of data-driven LSP establishment, an initial policy can be implemented in the LSR specifying what types of data packets to look for that can trigger an LSP. In some respects, this can appear to be similar to RSVP QoS policy where the decision to permit the resource reservation is outsourced to the PDP. In an MPLS in accordance with an embodiment of the present invention, however, the outsourced decision is not just to accept or deny the request, but involves a separate step of initiating the LSP session, as described below.

For example, an LSP may be required, in an embodiment, to support a specific service or set of services in the network. This may imply traffic characteristics for the LSP such as, for example, peak data rate, committed data rate, burst size, etc. If explicit routes are used, the PDP can determine the specific LSRs that are to be part of the path. The LSP may be partially explicit, specifying some specific LSRs that must be included, and the remainder of the LSP left to the routing protocols. An intelligent PDP may use feedback information from the LSRs to determine if they currently have sufficient resources free to support the resource requirements of the LSP. Alternatively, the LSP creation could use a topology-driven method where the path is determined by the routing protocol (and the underlying label distribution protocol processing). In such an embodiment, the LSP creation is initiated with specification of the traffic requirements. For any way that the LSP is routed, any traffic constraint requirements are met by all LSRs that get included in the LSP.

The PDP can issue a policy message to the ingress LSR of the LSP, including the explicit route information (if applicable), strict or loose route preferences, traffic parameters (constraint requirements), etc. In the COPS+PIB example, this is done via a COPS Decision (cops-pr, probably using a <cops-mpls> client type in the PEP) that includes MPLS PIBs describing the CR-LDP constraints.

The MPLS policy client in the LSR can take the message and initiate an LSP session. When CR-LDP is used, for example, this is done by sending a Label Request message containing the necessary CR-LDP Type Length Values ("TLV") (e.g., Explicit Route TLV, Traffic TLV, CD-LSP FEC, etc.). When RSVP is used, a path message containing the constraint information is sent from the ingress LSR to the egress LSR. The LSR establishment is similar, from a policy point of view, regardless of label distribution protocol used. In an embodiment as described herein, use of CR-LDP is described, but based on the written description herein the use of RSVP in an embodiment is apparent to one of skill in the art. The Label Request is propagated downstream and gets processed as usual according to CR-LDP procedures (e.g., downstream on demand label advertisement). When the egress LSR processes the Label Request, it issues a Label Mapping message that propagates back upstream establishing label mappings between MPLS peers for the LDP. Eventually the ingress LSR receives back a Label Mapping message from the next-hop LSR and it notifies the PDP of the label it received, to be used when forwarding packets to the next-hop on this LDP, and the LSPID. If the path could not be established, for example due to errors or insufficient resources or other issues, the error notification gets sent to the PDP. When COPS is used as the policy protocol, this is done with a COPS Report message, containing the MPLS label and referencing the Decision message that initiated the CR-LDP session.

LSP Admission Control. With the LSP established and the label to be used for sending packets to the next-hop on the LSP known, the PDP can issue policies to specify which packets/flows get mapped onto the LSP, i.e., which packets belong to the FEC for the LSP. Using the COPS and PIB example, this is done in a similar manner to the way packets get mapped to DiffServ Per Hop Behaviors ("PHB") in ingress routers of a DiffServ network. A COPS Decision message can be issued containing PIB table entries, for example, for: the classifier that specifies the FEC, a profile for policing and admission control to the LSP, the label to put on the packets that match the classifier, and what to do with packets that match but are out of profile.

As packets come into the ingress LSR the MPLS policy is enforced and packets are matched against the FEC classification and profile. The metering capability allows the PDP to specify a profile for policing so that admission control can be performed on the packets utilizing the LSP resources. Also, the policy installed by the PDP for the FEC can specify a MPLS Action table entry (e.g., of a PIB) for certain data packet types that might be admitted onto the LSP to authenticate the policy information about the packet with the PDP. This action is quite similar to the way COPS-RSVP works, where the PDP returns an accept/deny decision to indicate whether the packet is allowed access to the LSP or not. Packets that match the FEC classification, are in-profile, and have valid policy information (if applicable) get the label associated with the LSP for that FEC. This can involve pushing the label onto the top of a label stack if the packet already has a label for another LSP. This is handled according to MPLS label processing rules.

LSP Monitoring. The PDP can monitor the performance of the LSP to ensure the packets that are being mapped to the LSP receive the intended service. Information such as that specified in the MPLS LSR MIB, the in-segment performance table, the out-segment performance table, and so on may be used for this purpose (other data/stats may also be better or be better suited for this purpose). As the PDP gathers this feedback information, it makes decisions regarding the creation/deletion/changing of LSPs and the packets that get mapped onto them. Actions taken by the PDP as a result of performance feedback analysis may include re-directing existing LSPs to route traffic around high congestion areas of the network, changing traffic parameters associated with an LSP to reserve more resources for the FEC, adding a new LSP to handle overflow traffic from an existing path, tearing down an LSP no longer in use, and so on.

In an embodiment, a policy system can help to secure the MPLS system by providing appropriate controls on the LSP life cycle. Conversely, if the security of the policy system is compromised, then this may impact any MPLS systems controlled by that policy system. The MPLS network is not expected to impact the security of the policy system.

Embodiments of the present invention can include policy systems related to one or more of policy-based load balancing in traffic-engineered MPLS networks and traffic engineering of load distribution. An overview of load balancing and load distribution is first described, and then an embodiment of the present invention related to load balancing, which can be a specific sub-problem within load distribution, is described.

Load Balancing Overview

At least three fundamental features related to traffic engineering over MPLS networks are known: (a) mapping traffic to FECs; (b) mapping FECs to LSPs; and (c) mapping LSPs to physical topology. The first two features are discussed in greater detail herein as part of describing MPLS as an interesting subset of IP protocols, load balancing as a traffic engineering objective, and policy-based approaches for describing the objectives and constraints of the traffic engineering optimization.

Load balancing in MPLS networks concerns the allocation of traffic between two or more LSPs which can have the same origin and destination. In certain embodiments of the present invention, a pair of LSRs may be connected by several (e.g., parallel) links. From an MPLS traffic engineering point of view, for the purpose of scalability, it may be desirable to treat all these links as a single IP link in an operation known as Link Bundling. With load balancing, the load to be balanced is spread across multiple LSPs that in general does not require physical topology adjacency for the LSRs. The techniques can be complementary. Link bundling typically provides a local optimization that is particularly suited for aggregating low speed links. Load Balancing generally is targeted at larger scale network optimizations.

While load balancing is often considered to apply between edge LSRs, it can be applied in an embodiment at any LSR that provides the requisite multiple LSP tunnels with common endpoints. The Policy Enforcement Point is the LSR at the source end of the set of LSPs with common endpoints. The arriving traffic to be load balanced may be from non-MPLS interfaces or MPLS interfaces. In general, the source end of an LSP may act as a merge point for multiple input streams of traffic.

The set of LSPs over which the load is to be balanced can be pre-defined and the relevant load balancing policies are then applied to these LSPs. In another embodiment, LSPs can be created and deleted in response to policies with load balancing objectives. According to an embodiment of the present invention, best effort LSPs are considered, which can simplify the admission control considerations of a load balancing process. When LSPs are established with QoS constraints, it can be necessary to determine if the traffic flow sent over the LSP as a result of load balancing fit the profile of the constraints, which can add complexity to the load balancing policy as well as the processing of the LSR performing the load balancing.

While load balancing on a best effort network can be viewed as a simple case, the basic methodologies have a wider applicability when applied to QoS-based LSP selection. Indeed, the load balancing case for best effort only traffic has similar problems to that of load balancing a particular traffic class such as that with a particular DiffServ PHB. Bandwidth sharing among classes of service can raise some more complex issues that also apply to the placement of traffic into ER-LSPs. As the available capacity for a particular traffic class to a particular destination exceeds the capacity of the LSP for that traffic, an action can be taken to get more bandwidth or control access to the LSP. The PEP can perform an action per traffic class with a likely result that the best effort traffic on the network will become squeezed in favor of higher priority traffic. Lending of bandwidth between LSPs can be implemented as a policy. In an embodiment, the location of the network congestion can have a bearing on a solution, and a policy server can initiate a new LSP and map certain flows to this new LSP to avoid the congestion point, thereby improving the performance of those flows and reducing the congestion problem. This can, however, require a congestion detection methodology and inter-PDP communication.

In general, a policy provides a rule of the form: IF<condition> THEN <action>. Policy-based networking is one of a number of mechanisms that can be used in achieving traffic engineering objectives. While traffic engineering may be considered an optimization issue, policy approaches provide considerable flexibility in the specification of the network optimization objectives and constraints.

Engineering Framework. Within the Traffic Engineering ("TE") framework's taxonomy of traffic engineering systems, policies may be: (a) dependent on time or network state (e.g., either local or global); (b) based on algorithms executed offline or online; (c) stored centrally (e.g., in a directory) or distributed to an engineerable number of policy decision points; (d) prescriptive or descriptive; and (e) designed for open loop or closed loop network control. Network feedback can be an important part of policy-based networking. While network configuration (e.g., provisioning) can be performed in an open-loop manner, in general, policy-based networking can imply a closed-loop mechanism. Distribution and performance of the policy system can require adequate resources that are provisioned to meet the required policy update frequency and so on.

A traffic engineering framework can identify process model components for (a) measurement; (b) modeling, analysis, and simulation; and (c) optimization. Policies may be used to identify relevant measurements available through the network and trigger appropriate actions. The available traffic metrics for determining the policy trigger conditions can be constrained, e.g., by generic IP traffic metrics.

Policies can provide an abstraction of network resources, e.g., a model that can be designed to achieve traffic engineering objectives. Policies can provide a degree of analysis by identifying network problem through correlation of various measurements of network state. A set of policies can be designed to achieve an optimization of network performance through appropriate network provisioning actions.

Policy-based Load Balancing. In general, load balancing can be an example of traffic mapping. In an embodiment, a relative simplicity of load balancing algorithms can illustrate approaches to traffic engineering in the context of MPLS networks. While load balancing optimizations have been proposed for various routing protocols, such approaches typically complicate existing routing protocols and tend to optimize towards a fairly limited set of load balancing objectives. Extending these towards more flexible/dynamic load balancing objectives can be overly complicated. Hence, building on a policy-based networking architecture can provide mechanisms specifically designed to support flexible and dynamic administration.

Load Distribution Overview

Online traffic load distribution for a single class of service is known based in part on extensions to Interior Gateway Protocol ("IGP") that can provide loading information to network nodes. To perform traffic engineering of load distribution for multi-service networks, or off line traffic engineering of single service networks, a control mechanism for provisioning bandwidth according to a policy can be provided. Identified and described in this load distribution overview and herein are: (a) mechanisms that affect load distribution and the controls for mechanisms that affect load distribution to enable policy-based traffic engineering of the load distribution to be performed; (b) mechanisms that affect load distribution and the control for those mechanisms to enable policy-based traffic engineering of load distribution; and (c) a description of the use of load distribution mechanisms in the context of an IP network administration.

Introduction. The traffic load that an IP network supports may be distributed in various ways within the constraints of the topology of the network (e.g., avoiding routing loops). In an embodiment, a default mechanism for load distribution is to rely on an IGP (e.g., Intermediate System to Intermediate System ("IS-IS"), OSPF, etc.) to identify a single "shortest" path between any two endpoints of the network. "Shortest" is typically defined in terms of a minimization of an administrative weight (e.g., hop count) assigned to each link of the network topology. Having identified a single shortest path, all traffic between those endpoints then follows that path until the IGP detects a topology change. While often called dynamic routing (e.g., because it changes in response to topology changes), it can be better characterized as topology driven route determination.

This default IGP mechanism works well in a wide variety of operational contexts. Nonetheless, there are operational environments in which network operators may wish to use additional controls to affect the distribution of traffic within their networks. These may include: (a) service specific routing (e.g., voice service may utilize delay sensitive routing, but best effort service may not); (b) customer specific routing (e.g., VPNs); (c) tactical route changes where peak traffic demands exceed single link capacity; and (d) tactical route changes for fault avoidance. In an embodiment, a rationale for greater control of the load distribution than that provided by the default mechanisms is included.

Load Distribution. Traffic load distribution may be considered on a service-specific basis or aggregated across multiple services. In considering the load distribution, one can also distinguish between a snapshot of the network's state (e.g., a measurement) and an estimated (e.g., hypothetical) network state that may be based on estimated (e.g., projected) traffic demand. Load distribution can have two main components: (1) identification of routes over which traffic flows; and (2) in the case of multipath routing configurations (e.g., where multiple acyclic paths exist between common endpoints), the classification of flows determines the distribution of flows among those routes.

Traffic Load Definition and Measurement. With modern node equipment supporting wire speed forwarding, traffic load can be a link measurement. In other cases, node constraints (e.g., packet forwarding capacity) may be more relevant. Traffic load can be measured in units of network capacity, and network capacity is typically measured in units of bandwidth (e.g., with a magnitude dimensioned in bits/second or packets/second). However, bandwidth can be considered a vector quantity providing both a magnitude and a direction. Bandwidth magnitude measurements are typically made at some specific (but often implicit) point in the network where traffic is flowing in a specific direction (e.g., between two points of a unicast transmission). A significance arises from distinguishing between bandwidth measurements made on a link basis and bandwidth demands between end-points of a network.

A snapshot of the current load distribution may be identified through relevant measurements available on the network. The available traffic metrics for determining the load distribution include, for example, generic IP traffic metrics. The measurements of network capacity utilization can be combined with the information from the routing database to provide an overall perspective on the traffic distribution within the network. This information may be combined at the routers (and then reported back) or aggregated in the management system for dynamic traffic engineering.

A peak demand value of the traffic load magnitude (e.g., over some time interval, in the context of a specific traffic direction) may be used for network capacity planning purposes. Considering the increasing deployment of asymmetric host interfaces (e.g. Asymmetric Digital Subscriber Line ("ADSL")) and application software architectures (e.g. client-server), traffic load distribution is not necessarily symmetric between the opposite directions of transmission for any two endpoints of the network.

Load Distribution Controls. For a traffic engineering process to impact the network, there can be adequate controls within the network to implement the results of the offline traffic engineering processes. In an embodiment, the physical topology (e.g., links and nodes) can be fixed while considering the traffic engineering options for affecting the distribution of a traffic load over that topology. In another embodiment, new nodes and links can be added and considered a network capacity planning issue.

Fundamental load-affecting mechanisms include: (1) identification of suitable routes; and (2) in the case of multipath routing, allocation of traffic to a specific path. For traffic engineering purposes, the control mechanisms available can impact either of these mechanisms.

Control of the Load Distribution in the context of the TE Framework. When there is a need for control of the load distribution, the values of control parameters are unlikely to be static. Within the TE Framework's taxonomy of traffic engineering systems, control of load distribution may be: (a) dependent on time or network state (either local or global), e.g. based on IGP topology information; (b) based on algorithms executed offline or online; (c) impacted by open or closed loop network control; (d) centralized or distributed control of the distributed route set and traffic classification functions; or (e) prescriptive (i.e., a control function) rather than simply descriptive of network state.

Network feedback can be an important part of the dynamic control of load distribution within the network. While offline algorithms to compute a set of paths between ingress and egress points in an administrative domain may rely on historic load data, online adjustments to the traffic engineered paths typically will rely in part on the load information reported by the nodes.

The traffic engineering framework identifies process model components for: (a) measurement; (b) modeling, analysis, and simulation; and (c) optimization. Traffic load distribution measurement has already been described herein. Modeling, analysis, and simulation of the load distribution expected in the network is typically performed offline. Such analyses typically produce individual results of limited scope (e.g., valid for a specific demanded traffic load, fault condition, etc.). However, the accumulation of a number of such results can provide an indication of the robustness of a particular network configuration.

The notion of optimization of the load distribution can imply the existence of some objective optimization criteria and constraints. Load distribution optimization objectives may include: (a) elimination of overload conditions on links/nodes; and (b) equalization of load on links/nodes. A variety of load distribution constraints may be derived from equipment, network topology, operational practices, service agreements, etc. Load distribution constraints may include: (a) current topology/route database; (b) current planned changes to topology/route database; (c) capacity allocations for planned traffic demand; (d) capacity allocations for network protection purposes; and (e) service level agreements ("SLAs") for bandwidth and delay sensitivity of flows. Within the context of the traffic-engineering framework, control of the load distribution can be a core capability for enabling traffic engineering of the network.

Route Determination. Routing protocols are well known and this description of route determination focuses on specific operational aspects of controlling those routing protocols towards a traffic-engineered load distribution. A traffic engineered load distribution typically relies on something other than a default IGP rout set, and typically requires support for multiple path configurations. In an embodiment, the set of routes deployed for use within a network is not necessarily monolithic. Not all routes in the network may be determined by the same system. Routes may be static or dynamic. Routes may be determined by: (1) topology driven IGP; (2) explicitly specified; (3) capacity constraints (e.g., link/node/service bandwidth); (4) constraints on other desired route characteristics (e.g., delay, diversity/affinity with other routes, etc.). Combinations of the methods are possible, for example, determining partial explicit routes where some of the links are selected by the topology driven IGP, some routes may be automatically generated by the IGP, and others may be explicitly set by some management system.

Explicit routes are not necessarily static. Explicit routes may be generated periodically by an offline traffic engineering tool and provisioned into the network. MPLS provides efficient mechanisms for explicit routing and bandwidth reservation. Link capacity may be reserved for a variety of protection strategies as well as for planned traffic load demands and in response to signaled bandwidth requests (e.g. RSVP). When allocating capacity, there may be issues in the sequence regarding how capacity on specific routes is to be allocated affecting the overall traffic load capacity. It can be important during path selection to chose paths that have a minimal effect on future path setups. Aggregate capacity required for some paths may exceed the capacities of one or more links along the path, forcing the selection of an alternative path for that traffic. Constraint-based routing approaches may also provide mechanisms to support additional constraints (e.g., other than capacity based constraints).

There are known IGP (e.g. IS-IS, OSPF) enhancement proposals to support additional network state information for traffic engineering purposes (e.g., available link capacity). Alternatively, routers can report relevant network state information (e.g., raw and/or processed) directly to the management system.

In networks other than MPLS (e.g., PSTN), there can be some symmetry in the routing of traffic flows and aggregate demand. For the Internet, symmetry is unlikely to be achieved in routing (e.g., due to peering policies sending responses to different peering points than queries).

Controls over the determination of routes form an important aspect of traffic engineering for load distribution. Since the routing can operate over a specific topology, any control of the topology abstraction used provides some control of the set of possible routes.

Control of the topology abstraction. There are at least two major controls available on topology abstraction including the use of hierarchical routing and link bundling concepts. Hierarchical routing provides a mechanism to abstract portions of the network in order to simplify the topology over which routes are being selected. Hierarchical routing examples in IP networks include: (a) use of an Exterior Gateway Protocol ("EGP") (e.g. BGP) and an IGP (e.g., IS-IS); and (b) MPLS Label stacks. Such hierarchies can provide both a simplified topology and a coarse classification of traffic. Operational controls over route determination are another example. The default topology driven IGP typically provides the least administrative control over route determination. The main control available is the ability to modify the administrative weights. This has network wide effects and may result in unanticipated traffic shifts. A route set comprised entirely of completely-specified explicit-routes is the opposite extreme, i.e., complete offline operational control of the routing. A disadvantage of using explicit routes is the administrative burden and potential for human induced errors from using this approach on a large scale. Management systems (e.g., policy-based management) may be deployed to ease these operational concerns, while still providing more precise control over the routes deployed in the network. In MPLS enabled networks, explicit route specification is feasible and a finer grained approach is possible for classification, including service differentiation.

Traffic Classification in Multipath Routing Configurations. With multiple paths between two endpoints, there is a choice to be made as to which traffic to send down a particular path. The choice can be impacted by: (1) traffic source preferences (e.g., expressed as marking—Differentiated Services Code Points ("DSCP")); (2) traffic destination preferences (e.g., peering arrangements); (3) network operator preferences (e.g., time of day routing, scheduled facility maintenance, policy); and (4) network state (e.g., link congestion avoidance). There are a number of potential issues related to the use of multi-path routing including: (a) variable path Maximum Transmission Unit ("MTU"); (b) variable latencies; (c) increased difficulty in debugging; and (d) sequence integrity. These issues may be of particular concern when traffic from a single "flow" is routed over multiple paths or during the transition of traffic flow between paths. Known efforts have been made to consider these effects in the development of hashing algorithms for use in multipath routing. However, the transient effects of flow migration for other than best-effort flows have not been resolved.

The choice of traffic classification algorithm can be delegated to the network (e.g., load balancing—which may be done based on some hash of packet headers and/or random numbers). This approach is taken in Equal Cost Multipath Protocol ("ECMP") and Optimized Multipath Protocol ("OMP"). Alternatively, a policy-based approach has the advantage of permitting greater flexibility in the packet classification and path selection. This flexibility can be used for more sophisticated load balancing algorithms, or to meet churn in the network optimization objectives from new service requirements.

Multipath routing, in the absence of explicit routes, can be difficult to traffic engineer as it devolves to the problem of adjusting the administrative weights. MPLS networks provide a convenient and realistic context for multipath classification examples using explicit routes. One LSP could be established along the default IGP path. An additional LSP could be provisioned (in various ways) to meet different traffic engineering objectives.

Traffic Engineered Load Distribution in Multipath MPLS networks. Load balancing can be analyzed as a specific sub-problem within the topic of load distribution. Load-balancing essentially provides a partition of the traffic load across the multiple paths in the MPLS network.

Load Balancing Embodiments

Figure 7:
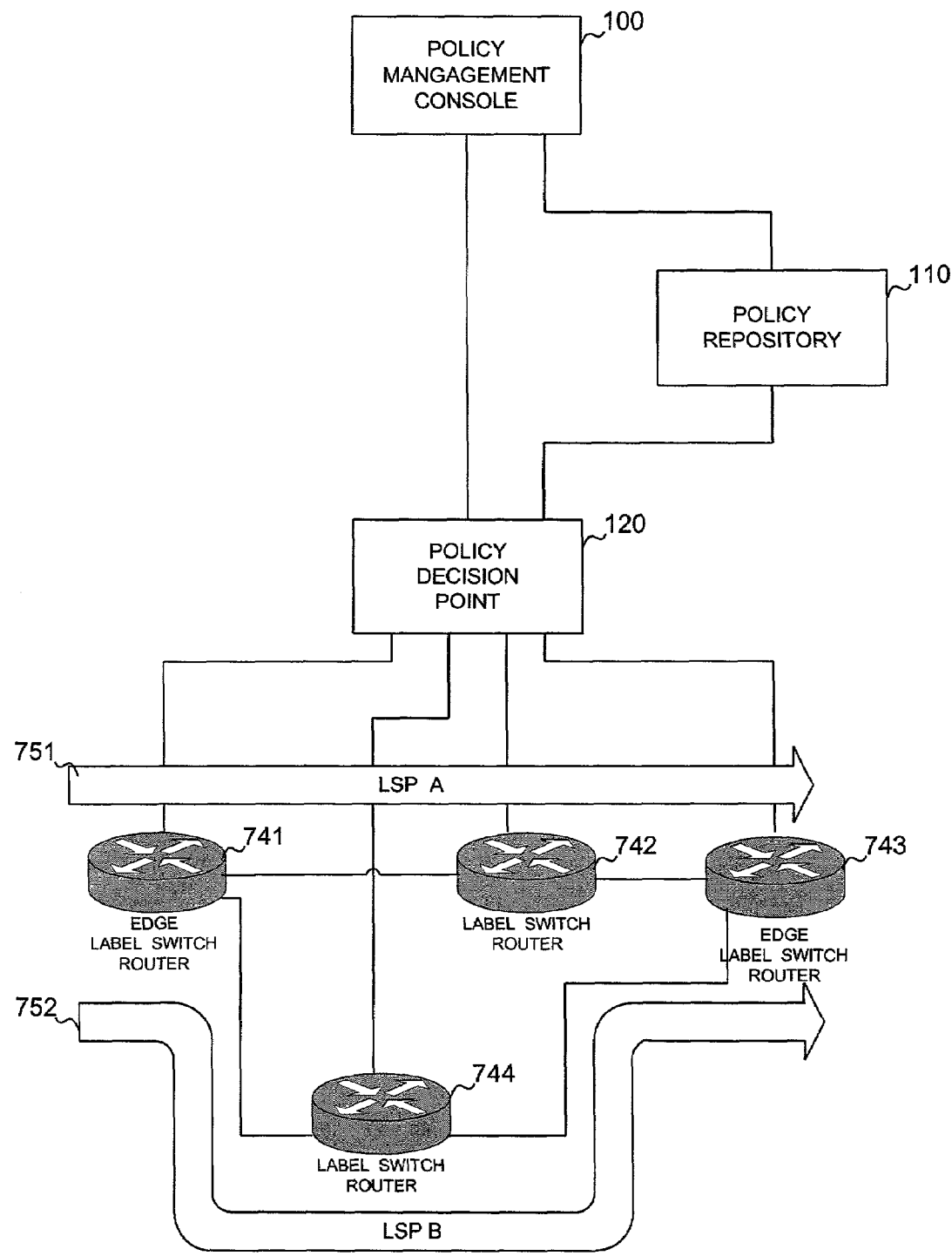
FIG. 7 illustrates a generic policy-based network architecture in the context of an MPLS network.

FIG. 7 illustrates a generic policy-based network architecture in the context of an MPLS network. In this embodiment, two LSPs are established: LSP A that follows the path of routers 741, 742 and 743, and LSP B that follows the path of routers 741, 744, and 743. A variety of mechanisms may be used for establishing the LSPs including, for example, manual (e.g., LSPs provision explicit routes) or automated (e.g., LSPs based on topology driven or data driven shortest path routes) establishment of the LSPs. In another embodiment, LSPs may be established via policy mechanisms (e.g., using COPS push, and so on).

A load balancing operation is performed at the LSR containing the ingress of the LSPs to be load balanced. LSR 741 is acting as the Policy Enforcement Point for load-balancing policies related to LSPs 751–752. The load-balancing encompasses the selection of suitable policies to control the admission of flows to both LSPs 751–752.

The admission decision for an LSP can be reflected in the placement of that LSP as the Next Hop Forwarding Label Entry ("NHFLE") within the appropriate routing tables within the LSR. Normally, there is only one NHLFE corresponding to each FEC, however there are some circumstances where multiple NHLFEs may exist for an FEC.

The conditions for the policies applying to the set of LSPs to be load balanced can be consistent. For example, if the condition used to allocate flows between LSPs is the source address range, then the set of policies applied to the set of LSPs can account for the disposition of the entire source address range.

For policy-based MPLS networks, traffic engineering policies also can be able to utilize for both conditions and actions the parameters available in the standard MPLS MIBs, such as MPLS Traffic Engineering MIB, MPLS LSR MIB, MPLS Packet Classifier MIB, and other MIB elements for additional traffic metrics.

Load Balancing at Edge of MPLS Domain. Flows admitted to an LSP at the edge of an MPLS domain can be described by the set of Forwarding Equivalence Classes (FECs) that are mapped to the LSPs in the FEC to NHLFE ("FTN") table. The load-balancing operation may be considered as redefining the FECs to send traffic along the appropriate path. Rather than sending all the traffic along a single LSP, the load balancing policy operation results in the creation of new FECs which effectively partition the traffic flow among the LSPs in order to achieve some load balance objective. As an example, two simple point-to-point LSPs with the same source and destination can have an aggregate FEC (z) load balanced. The aggregate FEC (z) is the union of FEC (a) and FEC (b). The load balancing policy may adjust the FEC (a) and FEC (b) definitions such that the aggregate FEC (z) is preserved.

Load Balancing at interior of MPLS Domain. Flows admitted to an LSP at the interior of an MPLS domain can be described by the set of labels that are mapped to the LSPs in the Incoming label Map ("ILM"). A Point-to-Point LSP that simply transits an LSR at the interior of an MPLS domain does not have an LSP ingress at this transit LSR. Merge points of a Multipoint-to-Point LSP may be considered as ingress points for the next link of the LSP. A label stacking operation may be considered as an ingress point to a new LSP. The above conditions, which put multiple LSPs onto different LSPs, may require balancing at the interior node. The FEC of an incoming flow may be inferred from its label. Hence load-balancing policies may operate based on incoming labels to segregate traffic rather than requiring the ability to walk up the incoming label stack to the packet header in order to reclassify the packet. The result is a coarse load balancing of LSPs onto one of a number of LSPs from the LSR to the egress LSR.

Load Balancing with Multiple NHLFEs. The MPLS Architecture identifies that the NHLFE may have multiple entries for one FEC. Multiple NHLFEs may be present to represent: (a) the Incoming FEC/label set is to be multicast; and (b) when route selection based on the EXPansion ("EXP") field in addition to the label is required. If both multicast and load balancing functions are required, it can be necessary to disambiguate the scope of the operations. The load balancing operation can partition a set of input traffic (e.g., defined as FECs or Labels) across a set of output LSPs. One or more of the arriving FECs may be multicast to both the set of load balanced LSPs as well as other LSPs. This can imply that the packet replication (multicast) function occurs before the load balancing. When the route selection is based on the EXP field, it can be a special case of the policy-based load-balancing approach. In an embodiment, replicating NHLFEs for this purpose be deprecated and the more generic policy-based approach be used to specify an FEC/label space partition based on the EXP field.

The load balancing function can be considered as part of the classification function and allows preserving a mapping of a FEC into one NHLFE for unicast. While classification of incoming flows into FECs is often thought of as an operation on some tuple of packet headers, this is not the only basis for classification because router state can also be used. An example of a tuple is a set of protocol header fields such as source address, destination address, and protocol ID. In an embodiment, the source port of a flow may be a useful basis on which to discriminate flows. As another example, a "random number" generated within the router may be attractive as the basis for allocating flows for a load balancing objective. An algorithm within the router, which may include some hash function on the packet headers, may generate the "random number."

MPLS Policies for Load Balancing. MPLS load balancing partitions an incoming stream of traffic across multiple LSPs. The load balancing policy, as well as the ingress LSR where the policy is enforced, can be able to distinctly identify LSPs. In an embodiment, the PDP that installs the load balancing policy has knowledge of the existing LSPs and is able to identify them in policy rules. One way to achieve this is through the binding of a label to an LSP. An example of an MPLS load-balancing policy may state for the simple case of balancing across two LSPs: IF traffic matches classifier, THEN forward on LSP 1, ELSE forward on LSP 2. Classification can be done on a number of parameters such as packet header fields, incoming labels, etc. The classification conditions of an MPLS load-balancing policy are thus effectively constrained to be able to specify the FEC in terms that can be resolved into MPLS packet classification MIB parameters.

Forwarding traffic on an LSP can be achieved by tagging the traffic with the appropriate label corresponding to the LSP. MPLS load-balancing policy actions typically result in the definition of a new aggregate FEC to be forwarded down a specific LSP. This would typically be achieved by appropriate provisioning of the FEC and routing tables (e.g., FTN and ILM), e.g., via the appropriate MIBs.

The basis for partitioning the traffic can be static or dynamic. Dynamic load balancing can be based on a dynamic administrative control (e.g., time of day), or it can form a closed control loop with some measured network parameter. In an embodiment, "voice trunk" LSP bandwidths can be adjusted periodically based on expected service demand (e.g., voice call intensity, voice call patterns, and so on). Static Partitioning of the Load can be based on information carried within the packet header (e.g. source/destination addresses, source/destination port numbers, packet size, protocol ID, etc.). Static partitioning can also be based on other information available at the LSR (e.g., the arriving physical interface). However if load partition is truly static, or at least very slowly changing (e.g., less than one change/day), then the need for a policy-based control of this provisioning information maybe debatable and a direct manipulation of the LSR MIB may suffice.

A control-loop based load-balancing scheme can seek to balance the load close to some objective, subject to error in the measurements and delays in the feedback loop. The objective may be based on a fraction of the input traffic to be sent down a link (e.g., 20% down a first LSP and 80% down a second LSP) in which case some measurement of the input traffic is required. The objective may also be based on avoiding congestive loss in which case some loss metric is required.

The metrics required for control loop load balancing may be derived from information available locally at the upstream LSR, or may be triggered by events distributed elsewhere in the network. In the latter case, the metrics can be delivered to the Policy Decision Point. Locally derived trigger conditions can be expected to avoid the propagation delays etc. associated with the general distributed case. Frequent notification of the state of these metrics increases network traffic and be undesirable.

In an embodiment, a single large flow is load balanced across a set of links. In this case policies based solely on the packet headers may be inadequate and some other approach (e.g. based on a random number generated within the router) may be required. The sequence integrity of the aggregate FEC forwarded over a set of load balancing LSPs may not be preserved under such a regime.

ECMP and OMP can embed the load balancing optimization problem in the IGP implementation. This may be appropriate in the context of a single service if the optimization objectives and constraints can be established. ECMP approaches apply equal cost routes, but do not provide guidance on allocating load between routes with different capacities. OMP attempts a network wide routing optimization (considering capacities) but assumes that all network services can be reduced to a single dimension of capacity. For networks requiring greater flexibility in the optimization objectives and constraints policy-based approaches may be appropriate.

Security Considerations. In an embodiment, the policy system provides a mechanism to configure the LSPs within LSRs. A system that can be configured can also be incorrectly configured with potentially disastrous results. The policy system can help to secure the MPLS system by providing appropriate controls on the LSP life cycle. Use of the COPS protocol within the policy system between the PEP/PDP allows the use of message level security for authentication, replay protection, and message integrity.

Existing protocols such as IPSEC (e.g., a collection of IP security measures that comprise an optional tunneling protocol for IPv6) can also be used to authenticate and secure the channel. The COPS protocol also provides a reliable transport mechanism with a session keep-alive.

Figure 8:
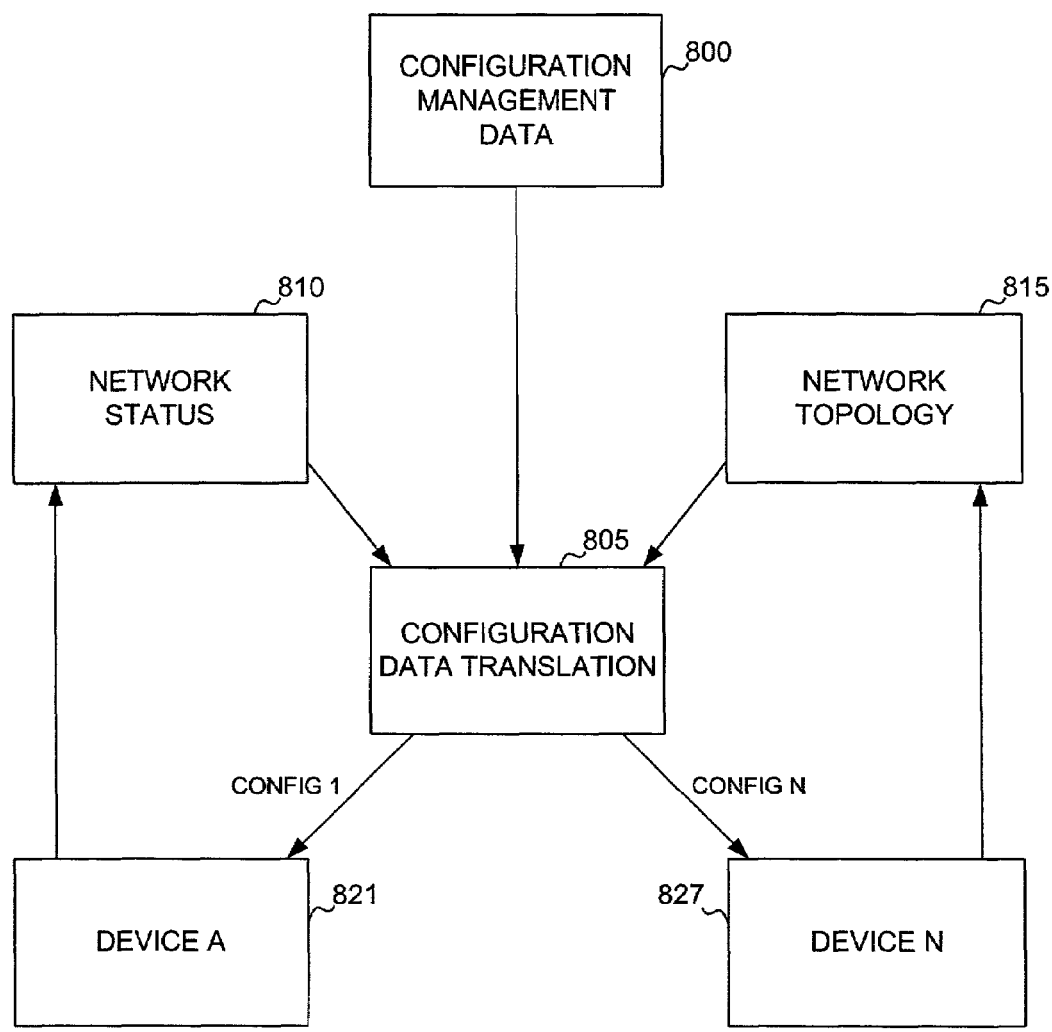
FIG. 8 shows an illustration of policy-based management with scaling by automation.

FIG. 8 shows an illustration of policy-based management with scaling by automation. Configuration management data 800 can include business and service level policies that are part of a PMC. The policies can be communicated to a configuration/data translation point 805, which is coupled to network devices such as device A 821 and device N 827. Device A 821 can communicate status information to network status point 810, and device N 827 can communicate state information to network topology 815. Each of network status point 810 and network topology point 815 can communicate information to configuration/data translation point 805 so that closed loop policies triggered by network state can automate network response to failures, congestion, demand changes, and so on. Accordingly, traffic engineering functions can move online.

Figure 9:
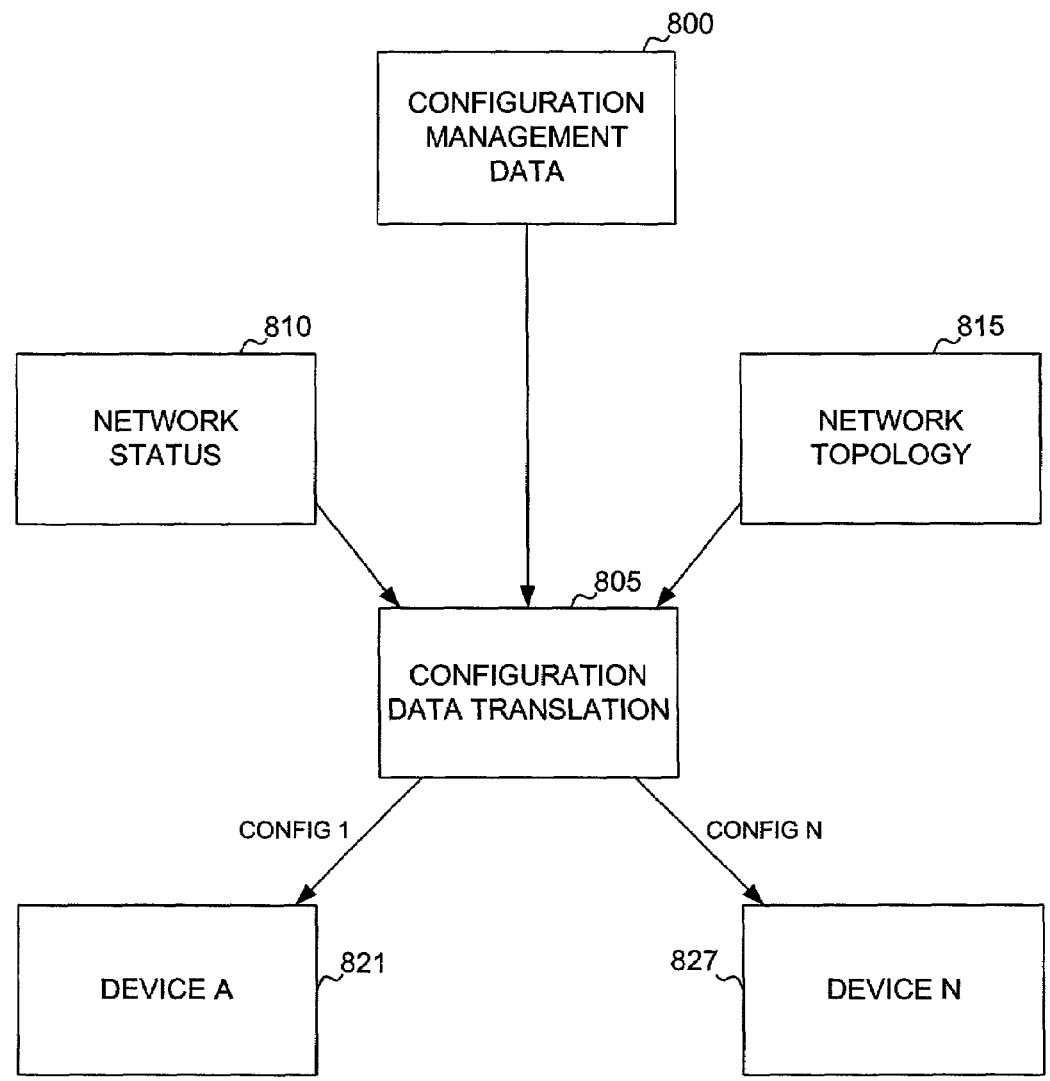
FIG. 9 shows an illustration of policy-based management with scaling by roles without closed loop policies triggered by network state.

FIG. 9 shows an illustration of policy-based management with scaling by roles without closed loop policies triggered by network state. Policy-based management, however, can automate the configuration translation functions to reduce errors and speed operations. Coherent policy can be applied across multiple device instances and device types using higher level abstractions such as roles.

Figure 10:
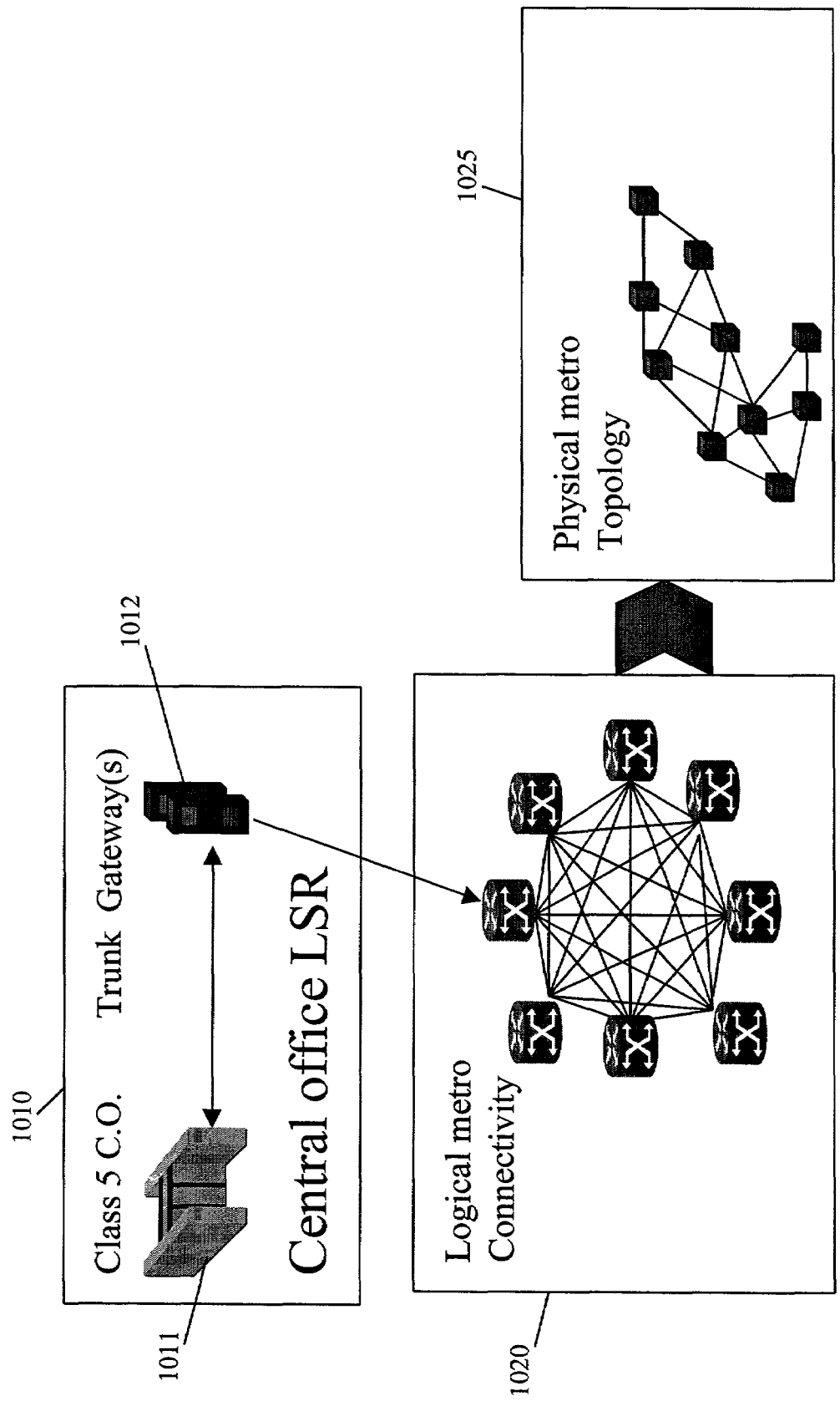
FIG. 10 shows an illustration of a large metro scale voice service architecture based in part on an MPLS network.

FIG. 10 shows an illustration of a large metropolitan scale voice service architecture based in part on an MPLS network. A central office 1010 includes class 5 central office equipment 1011 and trunk gateways 1012. In another embodiment, the central office can include line gateways, service gateways, and so on. The central office 1010 is coupled to an MPLS network 1020 providing logical metropolitan connectivity and corresponding to a physical metro topology 1025. In an embodiment, 1–5 million voice lines can be concentrated via 80–150 offices to attach via truck gateways to the MPLS network 1020. Each LSP of the MPLS network 1020 for the voice lines can have a low megabyte/second average bandwidth. In an embodiment, a full mesh interconnect with bi-directional LSPs can require 10–20,000 LSPs per metro for voice service.

In an embodiment, MPLS networks can be scaled by service and across a multi-state region, e.g., a multi-state region of a regional Bell operating company ("RBOC"). For example, in a nine state region having 38 local access and transport areas ("LATA"), aggregating the total number of LSPs implies greater than 100,000 LSPs across the region for voice service. More LSPs can be required for other services, and twice as many LSPs can be required for protected services. To provide metro/LATA interconnect (e.g., long distance voice service), a full mesh of LATAs would require 1–2000 LSPs for inter-LATA voice service interconnection.

Figure 11:
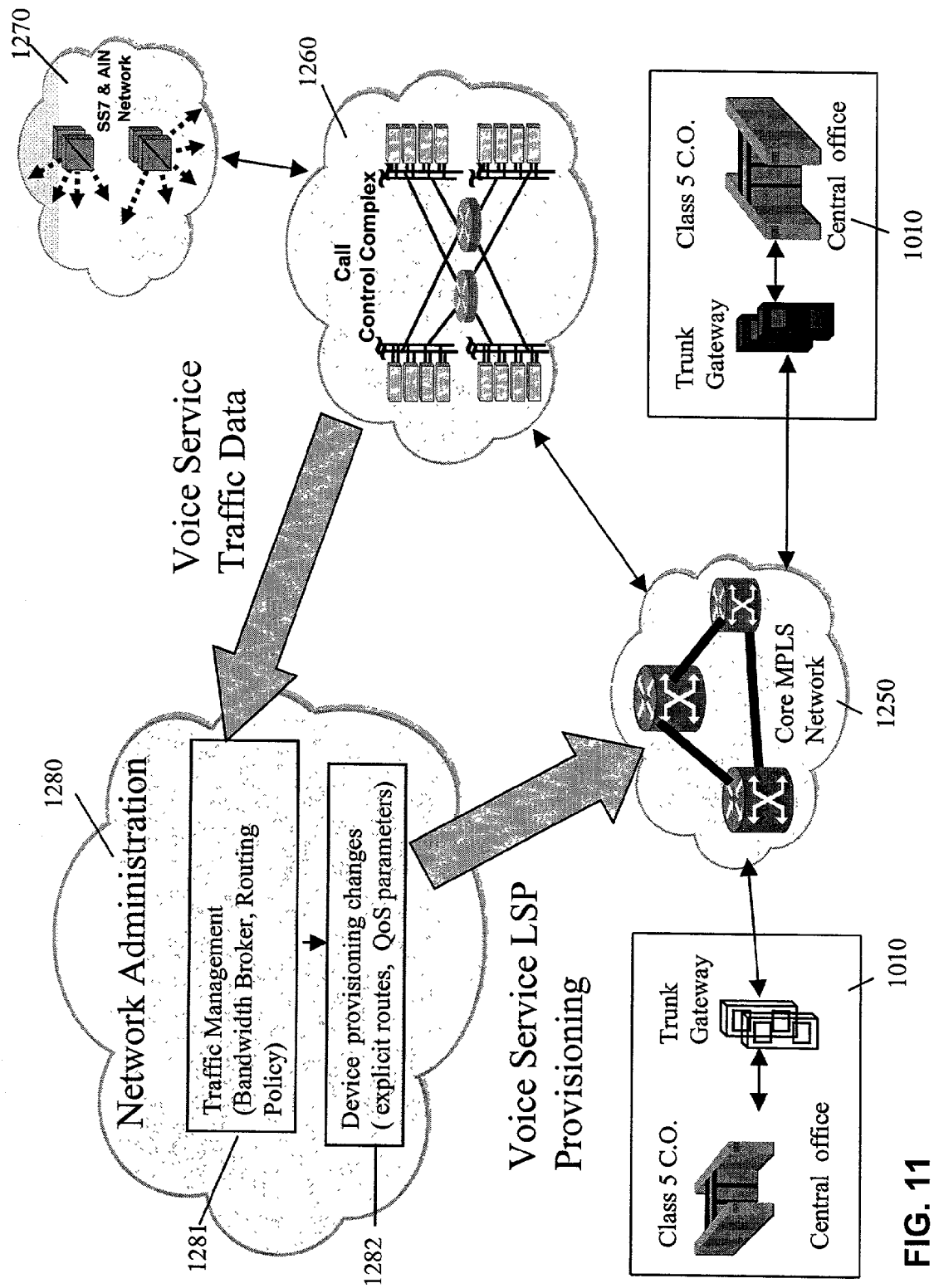
FIG. 11 shows an illustration of a policy-based management architecture for voice services over an MPLS network.

FIG. 11 shows an illustration of a policy-based management architecture for voice services over an MPLS network A call control complex 1260 can be coupled to a core MPLS network 1250 and a SS7/AIN network 1270 that provides PSTN voice services. The call control complex 1260 can send voice service traffic data to network administration 1280. The network administration 1280 can include traffic management information 1281 (e.g., bandwidth broker policies, routing policies, etc.) and device provisioning changes 1282 (e.g., explicit routes, QoS parameters, etc.). Network administration 1280 can thereby provide voice service LSP provisioning information (e.g., policies) to the core MPLS network 1250. In an embodiment, network administration

1280 can receive an estimate of traffic demand (e.g., from call control complex 1260, from elements of the SS7/AIN network 1270, and so on) to dimension (e.g., dynamically) the capacity of voice trunks in the MPLS network 1250.

In an embodiment of the present invention, the MPLS network 1250 includes one or more VPNs that are set up to handle particular types of traffic. For example, one or VPNs can be provisioned to carry voice traffic across the MPLS network 1250. As another example, VPNs can be provisioned to carry traffic from particular classes of customers, e.g., business customer traffic can be carried by one or more VPNs to provide a better quality of service, consumer customer traffic can be carried by one or more other VPNs to provide a lower quality of service than business customer traffic receives, and so on. Policy-based control can configure the LSRs of the MPLS network 1250 so that, for example, voice traffic is set up with an appropriate quality of service level and data traffic is likewise set up with an appropriate quality of service level.

As used to describe embodiments of the present invention, the term "coupled" encompasses a direct connection, an indirect connection, or a combination thereof. Moreover, two devices that are coupled can engage in direct communications, in indirect communications, or a combination thereof.

Embodiments of the present invention relate to data communications via one or more networks (e.g., MPLS networks). The data communications can be carried by one or more communications channels of the one or more networks. A network can include wired communication links (e.g., coaxial cable, copper wires, optical fibers, a combination thereof, and so on), wireless communication links (e.g., satellite communication links, terrestrial wireless communication links, satellite-to-terrestrial communication links, a combination thereof, and so on), or a combination thereof. A communications link can include one or more communications channels, where a communications channel carries communications. For example, a communications link can include multiplexed communications channels, such as time division multiplexing ("TDM") channels, frequency division multiplexing ("FDM") channels, code division multiplexing ("CDM") channels, wave division multiplexing ("WDM") channels, a combination thereof, and so on.

In accordance with an embodiment of the present invention, instructions adapted to be executed by a processor to perform a method are stored on a computer-readable medium. The computer-readable medium can be a device that stores digital information. For example, a computer-readable medium includes a compact disc read-only memory (CD-ROM) as is known in the art for storing software. The computer-readable medium is accessed by a processor suitable for executing instructions adapted to be executed. The terms "instructions adapted to be executed" and "instructions to be executed" are meant to encompass any instructions that are ready to be executed in their present form (e.g., machine code) by a processor, or require further manipulation (e.g., compilation, decryption, or provided with an access code, etc.) to be ready to be executed by a processor.

Embodiments of systems and methods for policy-enabled communications networks have been described. In the foregoing description, for purposes of explanation, numerous specific details are set forth to provide a thorough understanding of the present invention. It will be appreciated, however, by one skilled in the art that the present invention may be practiced without these specific details. In other instances, structures and devices are shown in block diagram form. Furthermore, one skilled in the art can readily appreciate that the specific sequences in which methods are presented and preformed are illustrative and it is contemplated that the sequences can be varied and still remain within the spirit and scope of the present invention.

In the foregoing detailed description, systems and methods in accordance with embodiments of the present invention have been described with reference to specific exemplary embodiments. Accordingly, the present specification and figures are to be regarded as illustrative rather than restrictive.

What is claimed is:

1. A system for policy-based control of a label switching network carrying one or more of voice and data traffic, the system comprising:
   a central office, the central office including a trunk gateway;
   the label switching network being coupled to the trunk gateway of the central office;
   a network administration system, the network administration system including a plurality of policies stored in a policy repository each policy of at least a subset of the plurality of policies controlling, at least in part, the operation of the label switching network wherein a policy is one of an admission policy and a life cycle policy wherein further an admission policy maps packet traffic flows onto one or more label switched paths within the label switching network and a life cycle policy creates, deletes and monitors the one or more label switched paths within the label switching network; and
   a call control complex, the call control complex coupled to the network administration system and the label switching network.

2. The system of claim 1, wherein the gateway is one of a line gateway, a trunk gateway, and a service gateway.

3. The system of claim 1, wherein the central office includes class five central office equipment.

4. The system of claim 1, wherein the network administration system includes one or more of traffic management information and device provisioning information.

5. The system of claim 1, wherein the plurality of policies include a plurality of traffic management policies.

6. The system of claim 1, wherein the call control complex is to send voice service traffic data to the network administration system.

7. The system of claim 6, wherein the network administration system is to send voice service label switched path provisioning policies to the label switching network.

8. The system of claim 6, wherein the network administration system is to send virtual private network provisioning policies to the label switching network.

9. The system of claim 1, wherein the label switching network is a multiprotocol label switching ("MPLS"), the system further comprising an SS7/AIN network coupled to the call control complex.

10. The system of claim 9, wherein the SS7/AIN network and the MPLS network are part of a regional telecommunications company network.

11. A method of operating a label switching network with policy based management, the method comprising:
   operating at least a portion of the label switching network based at least in part on a first policy, wherein a policy is one of an admission policy and a life cycle policy wherein further an admission policy maps packet traffic flows onto one or more label switched paths within the label switching network and a life cycle policy creates and deletes the one or more label switched paths within the label switching network;

receiving a control input;

selecting a second policy based at least in part on the control input, the second policy being different from the first policy; and operating at least the portion of the label switching network based at least in part on the second policy.

12. The method of claim 11, wherein operating at least a portion of the label switching network based at least in part on a first policy includes operating at least a portion of the label switching network as one or more voice trunks based at least in part on a first voice traffic policy.

13. The method of claim 12, wherein receiving a control input includes receiving a voice traffic condition.

14. The method of claim 13, wherein the voice traffic condition is selected from the group consisting of time of day, measured voice traffic demand, estimated voice traffic demand, projected voice traffic demand, and a customer request.

15. The method of claim 12, wherein receiving the control input includes receiving network status information from a network device of the label switching network.

16. The method of claim 11, wherein operating at least a portion of the label switching network based at least in part on a first policy includes operating at least a portion of the label switching network as one or more virtual private networks based at least in part on a first virtual network policy.

17. A method for policy-based management of a label switching network, the method comprising:

a step for operating at least a portion of the label switching network based at least in part on a first policy, wherein a policy is one of an admission policy and a life cycle policy wherein further an admission policy maps packet traffic flows onto one or more label switched paths within the label switching network and a life cycle policy creates deletes and configures the one or more label switched paths within the label switching network;

a step for receiving a control input;

a step for selecting a second policy based at least in part on the control input, the second policy being different from the first policy; and a step for operating at least the portion of the label switching network based at least in part on the second policy.

18. The method of claim 17, wherein the first policy is selected from the group consisting of a voice traffic management policy, a virtual private network management policy, and a quality of service management policy.

* * * * *